United States Patent
Johnson et al.

(10) Patent No.: US 8,125,168 B2
(45) Date of Patent: Feb. 28, 2012

(54) MOTOR HAVING CONTROLLABLE TORQUE

(75) Inventors: Andrew T. Johnson, Scottsdale, AZ (US); Casey Hanlon, Queen Creek, AZ (US)

(73) Assignee: Honeywell International Inc., Morristown, NJ (US)

( * ) Notice: Subject to any disclaimer, the term of this patent is extended or adjusted under 35 U.S.C. 154(b) by 449 days.

(21) Appl. No.: 11/942,412

(22) Filed: Nov. 19, 2007

(65) Prior Publication Data

US 2009/0128084 A1    May 21, 2009

(51) Int. Cl.
*H02P 6/00* (2006.01)
(52) U.S. Cl. ......... 318/400.01; 318/400.15; 318/400.38; 318/830
(58) Field of Classification Search .......... 318/700, 318/400.01, 400.15, 400.2, 832, 254.1, 297, 318/400.38, 400.41, 823, 830; 310/12.15, 310/12.21, 49.29, 49.31
See application file for complete search history.

(56) References Cited

U.S. PATENT DOCUMENTS

| | | | |
|---|---|---|---|
| 4,187,457 A | 2/1980 | Wanlass | |
| 4,371,801 A | 2/1983 | Richter | |
| 4,663,581 A | 5/1987 | Glennon | |
| 5,053,689 A | 10/1991 | Woodson et al. | |
| 5,099,186 A * | 3/1992 | Rippel et al. | 318/803 |
| 5,177,391 A | 1/1993 | Kusase | |
| 5,365,153 A * | 11/1994 | Fujita et al. | 318/34 |
| 5,705,909 A * | 1/1998 | Rajashekara | 318/801 |
| 5,723,930 A * | 3/1998 | Ho et al. | 310/179 |
| 5,811,905 A | 9/1998 | Tang | |
| 5,929,549 A * | 7/1999 | Trago et al. | 310/198 |
| 5,955,809 A | 9/1999 | Shah | |
| 6,121,707 A * | 9/2000 | Bell et al. | 310/179 |
| 6,229,241 B1 * | 5/2001 | Ishigami et al. | 310/208 |
| 6,242,884 B1 | 6/2001 | Lipo et al. | |
| 6,531,799 B1 | 3/2003 | Miller | |
| 6,573,672 B2 | 6/2003 | O'Rourke et al. | |
| 6,630,804 B2 * | 10/2003 | Moriya et al. | 318/85 |
| 6,815,920 B2 * | 11/2004 | Cohen et al. | 318/599 |

(Continued)

FOREIGN PATENT DOCUMENTS

JP    2006060906    3/2006

OTHER PUBLICATIONS

European Search Report for Application No. 08169254, mailed on Mar. 23, 2009.

*Primary Examiner* — Walter Benson
*Assistant Examiner* — Thai Dinh
(74) *Attorney, Agent, or Firm* — Ingrassia Fisher & Lorenz, P.C.

(57) ABSTRACT

A controllable motor includes a rotor. A first stator winding set is operable, upon being energized, to generate and apply a first torque to the rotor. A second stator winding set independent of the first stator winding set is operable, upon being energized, to generate and apply a second torque to the rotor. A motor control is coupled to the first and second stator winding sets. The motor control is operable to selectively energize one of the first or second stator winding sets to thereby generate and apply one of the first or second torques to the rotor, and simultaneously energize both the first and second stator winding sets to thereby generate and apply a third torque greater than the first or the second torque.

15 Claims, 2 Drawing Sheets

U.S. PATENT DOCUMENTS

| | | |
|---|---|---|
| 6,864,648 B1 | 3/2005 | Stedman |
| 6,956,341 B2 * | 10/2005 | Nakai et al. ............... 318/400.01 |
| 7,157,875 B2 * | 1/2007 | Kamen et al. ................. 318/434 |
| 7,276,865 B2 * | 10/2007 | Ochiai ............................ 318/34 |
| 7,439,697 B2 * | 10/2008 | Miyazaki et al. ........ 318/400.41 |
| 7,659,686 B2 * | 2/2010 | Osada et al. ................... 318/771 |
| 7,868,573 B2 * | 1/2011 | Lewis ........................... 318/538 |
| 2004/0195925 A1 | 10/2004 | Kusase et al. |
| 2004/0222754 A1 * | 11/2004 | Ochiai et al. .................. 318/105 |
| 2007/0241699 A1 | 10/2007 | Osada et al. |

* cited by examiner

MOTOR HAVING CONTROLLABLE TORQUE

TECHNICAL FIELD

The present invention relates to electric motors, and more specifically, to electric motors having controllable torque.

BACKGROUND

Electric motors are commonplace in today's society. Motors of various types and sizes are used in numerous settings. Some electric motors incorporate a set of redundant motor windings to provide a backup mechanism in the highly unlikely event that the set of first motor windings becomes inoperable. Such redundant winding sets may be found in various applications such as in aerospace environments.

For electric motors with redundant motor winding sets, it is desirable to size each winding set for the full range of performance duty cycles during normal motor operation. Doing so results in full performance being available from either winding set in the highly unlikely event that one set becomes inoperable. Sizing and aligning each winding for a highly unlikely event where high load and corresponding additional torque is demanded from the motor may necessitate an undesirable large weight and size increase.

BRIEF SUMMARY

A need exists for a motor configuration providing reserve capacity in the event of high load/high capacity demand without the addition of undesirable weight and size increases. Accordingly, in one embodiment, and by way of example only, a controllable motor is provided. The controllable motor includes a rotor. A first stator winding set is operable, upon being energized, to generate and apply a first torque to the rotor. A second stator winding set independent of the first stator winding set is operable, upon being energized, to generate and apply a second torque to the rotor. A motor control is coupled to the first and second stator winding sets. The motor control is operable to selectively energize one of the first or second stator winding sets to thereby generate and apply one of the first or second torques to the rotor, and simultaneously energize both the first and second stator winding sets to thereby generate and apply a third torque greater than the first or the second torque.

In another embodiment, again by way of example only, a method of controlling torque in an electric motor is disclosed. A first stator winding set is energized to generate and apply a first, nominal torque to a rotor. A second stator winding set is selectively energized simultaneously with the first stator winding set to generate and apply a second torque, the second torque in addition to the first, nominal torque.

In another embodiment, again by way of example only, a system for controlling torque in an electric motor is disclosed. The system includes means for energizing a first stator winding set to generate and apply a first, nominal torque to a rotor, and means for selectively energizing a second stator winding set simultaneously with the first stator winding set to generate and apply a second torque, the second torque in addition to the first, nominal torque.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Figure 1:
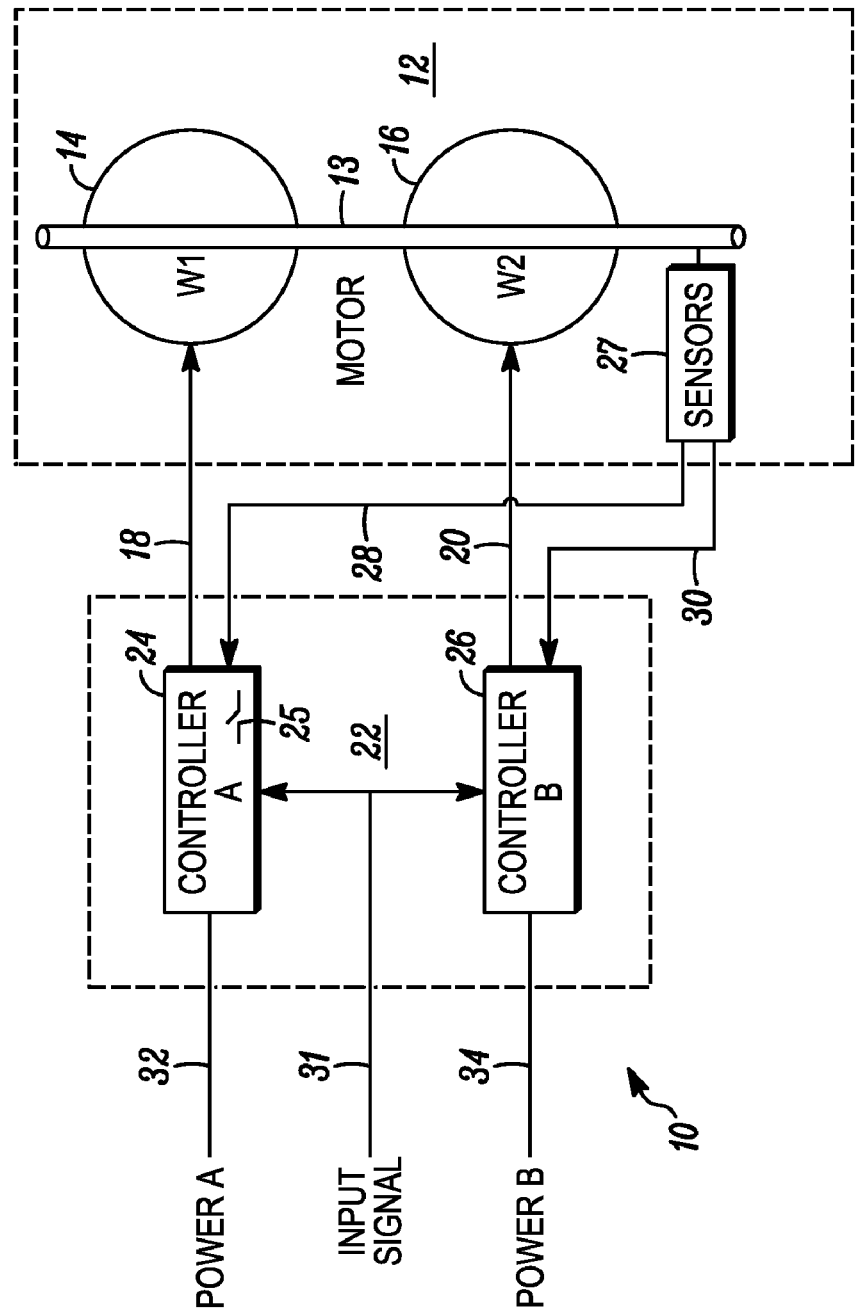
FIG. 1 illustrates an exemplary motor having multiple sets of windings to generate and apply controllable torque to a rotor.

Turning to FIG. 1, an exemplary embodiment of a system 10 that provides controllable torque is shown. System 10 includes a motor 12 and a motor control 22. The motor includes a rotor 13, a first stator winding set 14 (denoted by W1) and a second stator winding set (denoted by W2). Although the primary and secondary winding sets are shown conceptually apart, in practice, the primary and second winding sets may be wound coaxially with respect to the rotor 13. Each winding set 12, 14 may be variably wound. For example, in a three-phase embodiment, the winding sets may be connected in a delta or wye configuration.

Motor control 22 is implemented as a dual-channel control and selectively energizes primary winding set 14, secondary winding set 16, or both primary and secondary winding sets 14 and 16. Dual-channel motor control 22 includes controls 24 and 26 which are coupled to winding sets 14 and 16 over lines 18 and 20. In another embodiment, control 22 may include a single control or switch that selectively energizes winding set 14, winding set 16, or both winding sets simultaneously. Control 24 may include logic, hardware, or similar means to implement a plurality of switches 25 causing winding set 14 to become energized. Similarly, control 26 may implement such switch functionality.

Sensors 27 provide feedback information to controls 24 and 26 through lines 28 and 30. Such feedback information may be provided using position sensors 27 such as Hall-effect sensors 27. In other embodiments, the motor 12 may be operated pursuant to sensorless control. Controls 24 and 26 receive feedback information such as rotor position signals through lines 18 and 20. Finally, power signals 32 and 34 supply electrical power to both control 22 and thereby, to motor 12.

Control 22 may include various subcomponents for selectively energizing the windings 14 and 16 and receiving feedback, as one skilled in art will appreciate. For example, the controls 24 and 26 may include digital signal processor (DSP) devices (not shown) for converting analog signals to digital signals and vice-versa. Further, the controls 24 and 26 may include other processor devices (again, not shown) to calculate rotor phase signals.

Controls 24 and 26 may be configured to receive an input signal 31 from a third party component, such as a flight control system component, that indicates that a greater amount of torque is necessitated at a given point in time. For example, during a normal operation, controls 24 and 26 may be configured to operate such that winding set 14 is energized. During the normal operation, the controls 24 and 26 may receive the input signal 31 indicating a demand for increased motor torque. The controls 24 and 26, in response to the input signal 31, energize both winding sets 14 and 16 simultaneously to generate greater torque.

As one skilled in the art will appreciate, the system 10 and motor 12 may be applied in a variety of settings where redundant winding motors are provided, and yet where a high load/high torque capacity may be occasionally demanded. For example, such a system 10 may be incorporated into a flight control system in an aircraft, a stability control system for an automobile, or in other situations where a high degree of redundancy is desired.

Figure 2:
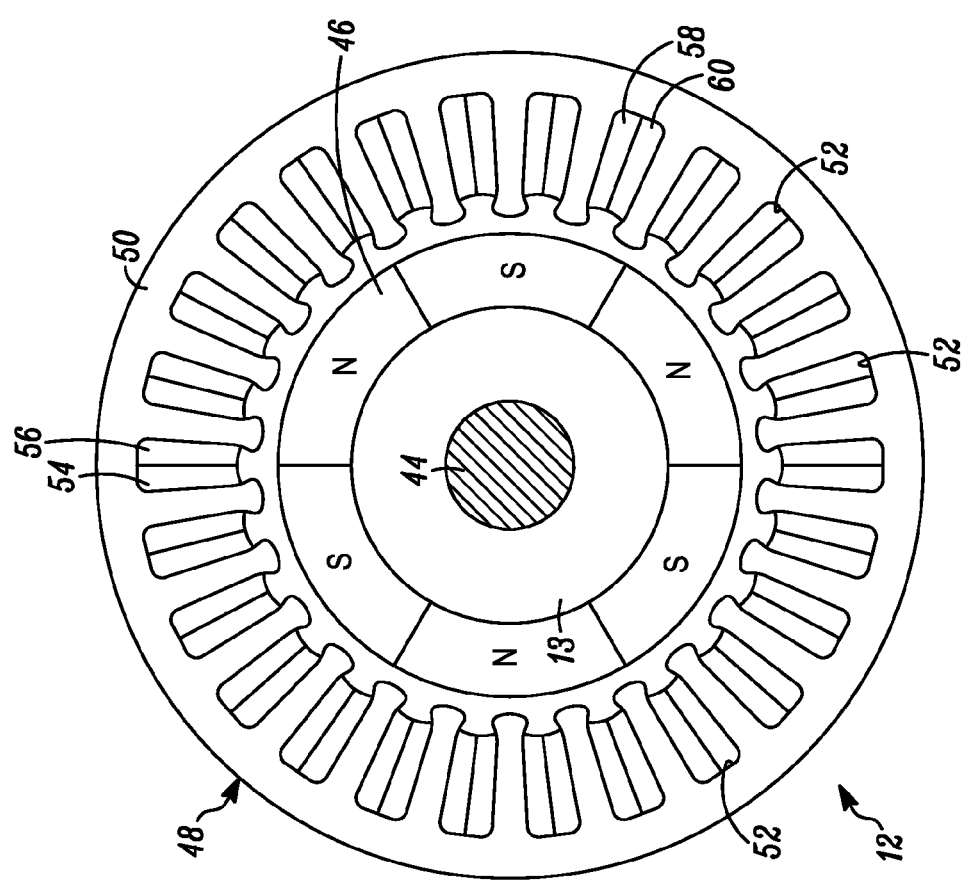
FIG. 2 illustrates multiple winding sets integrated into the exemplary motor shown in FIG. 1.

Referring now to FIG. 2, an exemplary embodiment of a three-phase brushless direct current (BLDC) motor 12 or permanent magnet synchronous machine 12 (PMSM) that may be used to implement system 10 (FIG. 1) is depicted. Motor 12 includes a six-pole, permanent magnet rotor 13, which is mounted on a shaft 44 and has six magnetic poles 46. A stator 48 features stacked laminations 50 defining twenty-seven slots 52. As one skilled in the art will appreciate, however, the number of slots may vary from application to application, as will the number of poles. In addition, one skilled in the art will appreciate that the instant description and following claimed subject matter is applicable to various other motor configurations in addition to BLDC or PMSM motor configurations.

As seen each slot houses a portion of the primary winding set (e.g., winding portions 54 and 58) and a portion of the redundant, secondary winding set (e.g., winding portions 56 and 60). As such, in the depicted embodiment, the primary winding sets and secondary winding sets may be referred to as primary and secondary stator winding sets. Primary winding set portion 54 and redundant winding set portion 56 contain coils from the same phase and are connected according to the same polarity (positive or negative). Similarly, primary winding set portion 58 and redundant winding set portion 60 contain coils from the same phase and are connected according to the same polarity. The primary and secondary winding sets are coaxially wound with respect to the rotor 13.

The primary and redundant winding sets (including primary winding set portions 54 and 58 and redundant, secondary winding set portions 56 and 60) are configured such that magnetic fluxes associated with the winding sets are additive and in-phase. For example, in one embodiment, primary winding set portion 54 and redundant, secondary winding set portion 56 may be of phase "A" in a three-phase (ABC) configuration. While in the exemplary embodiment portions of the primary and redundant windings are positioned to lie within a shared slot, those skilled in the art will appreciate that other configurations of the primary and redundant windings may also be utilized, so long as the primary and redundant windings remain in-phase and the associated magnetic flux remains additive.

While it is recognized that, having sized a motor for normal single set operation, energizing both sets of windings will likely drive the iron into saturation and non-linear operation (should the specific motor technology require back iron), and potentially result in rapid heating, these may be accounted for in the performance sizing of the application for the highly improbable transient event.

In light of the foregoing drawings, a method for controlling torque in an electric motor may be implemented as follows. A first winding set may be energized to provide a nominal torque. A second winding set may then be selectively energized simultaneously with the first winding set to provide an additional torque.

In various embodiments, a controller may activate a switch to selectively energize the second winding set. Control 24 or 26 (FIG. 1) may send a control signal to activate the switch to selectively energize the second winding set. Control 24 or 26 may receive a motor position as feedback to facilitate motor commutation, for example. Control 24 or 26 may receive an input signal 27 (FIG. 1) from a third party component indicating a desired torque. For example, control 24 or 26 may be in a normal operation mode where one winding is operational providing a nominal torque. The input signal may be received (for example, from a flight control component) indicating a demand for greater torque. In response, the controller 24 or 26 may selectively activate the non-active winding set to drive both primary and redundant, secondary winding sets simultaneously to provide additional torque.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention.

What is claimed is:

1. A controllable motor, comprising:
   a single rotor;
   a single stator having a plurality of slots formed therein;
   a first stator winding set wound on the stator and at least partially housed within each of the plurality of slots, the first stator winding set operable, upon being energized, to generate and apply a first torque to the rotor;
   a second stator winding set, independent of the first stator winding set, wound on the stator and at least partially housed within each of the plurality of slots, the second stator winding set operable, upon being energized, to generate and apply a second torque to the rotor; and
   a motor control coupled to the first and second stator winding sets, the motor control operable to selectively:
      (i) energize one of the first or second stator winding sets to thereby generate and apply one of the first or second torques to the rotor, and
      (ii) simultaneously energize both the first and second stator winding sets to thereby generate and apply a third torque greater than the first or the second torque,
   wherein the first and second stator winding sets are wound such that first and second magnetic fluxes associated with the first and second stator winding sets are in-phase and additive.

2. The motor of claim 1, wherein the first and second stator winding sets are coaxially wound with respect to the rotor.

3. The motor of claim 1, wherein a portion of the first and second stator winding sets are connected according to a shared electrical polarity.

4. The motor of claim 1, wherein the motor control is in electrical communication with a Hall-effect sensor for motor commutation.

5. The motor of claim 1, wherein the motor is a brushless direct current (DC) motor or permanent magnet synchronous machine.

6. A method of controlling torque in an electric motor, comprising:
   energizing a first stator winding set that is wound on a stator to generate and apply a first, nominal torque to a rotor, the stator having a plurality of slots formed therein and the first stator winding set at least partially housed within each of the plurality of slots; and
   selectively energizing a second stator winding set that is wound on the stator simultaneous with energizing the first stator winding set to generate and apply a second torque to the rotor, the second torque in addition to the first, nominal torque, the second stator winding set at least partially housed within each of the plurality of slots, wherein the first and second stator winding sets are wound such that first and second magnetic fluxes associated with the first and second stator winding sets are in-phase and additive.

7. The method of claim 6, further including activating a switch to selectively energize the second stator winding set.

8. The method of claim 6, further including sending a control signal to activate the switch.

9. The method of claim 6, further including receiving a motor position to facilitate motor commutation.

10. The method of claim 6, further including receiving an input signal reflecting a demand for the second torque.

11. A system for controlling torque in an electric motor, comprising:
   a single rotor;
   a single stator;
   a first stator winding set wound on the stator and at least partially housed within each of the plurality of slots, the first stator winding set operable, upon being energized, to generate and apply a first torque to the rotor;
   a second stator winding set, independent of the first stator winding set, wound on the stator and at least partially housed within each of the plurality of slots, the second stator winding set operable, upon being energized, to generate and apply a second torque to the rotor;
   means for energizing the first stator winding set to generate and apply a first, nominal torque to the rotor; and
   means for selectively energizing the second stator winding set simultaneously with the first stator winding set to generate and apply a second torque to the rotor, the second torque in addition to the first, nominal torque,
   wherein the first and second stator winding sets are wound such that first and second magnetic fluxes associated with the first and second stator winding sets are in-phase and additive.

12. The system of claim 11, further including means for activating a switch to selectively energize the second stator winding set.

13. The system of claim 11, further including means for sending a control signal to activate the switch.

14. The system of claim 11, further including means for receiving a motor position to facilitate motor commutation.

15. The system of claim 11, further including means for receiving an input signal reflecting a demand for the second torque.

* * * * *